United States Patent [19]

Mazaki et al.

[11] Patent Number: 5,391,688
[45] Date of Patent: Feb. 21, 1995

[54] LIQUID CRYSTALLINE POLYESTERS

[75] Inventors: Hitoshi Mazaki, Kawasaki; Takehiro Toyooka; Iwane Shiozaki, both of Yokohama, all of Japan

[73] Assignee: Nippon Oil Company, Limited, Tokyo, Japan

[21] Appl. No.: 182,589

[22] Filed: Jan. 18, 1994

[30] Foreign Application Priority Data

Jan. 22, 1993 [JP] Japan .................. 5-041662

[51] Int. Cl.$^6$ .............................. C08G 63/18
[52] U.S. Cl. .................... 528/193; 528/176; 528/191; 528/194; 528/219; 528/272; 528/302; 528/308.6
[58] Field of Search ............ 528/176, 191, 193, 194, 528/219, 272, 302, 308.6

[56] References Cited

U.S. PATENT DOCUMENTS 4,999,416  3/1991  Kaminade et al. .................. 528/190

Primary Examiner—Samuel A. Acquah
Attorney, Agent, or Firm—Scully, Scott, Murphy & Presser

[57] ABSTRACT

It is intended to provide a liquid crystalline polyester whose orientation in the state of liquid crystal can be easily immobilized as glass phase and which is suitable for application to optical elements.

A liquid crystalline polyester comprising repeating units a, b, c and d represented by the following general formulae:

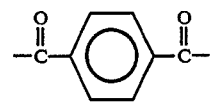

[a]

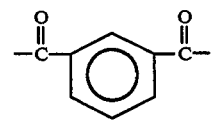

[b]

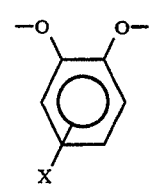

[c]

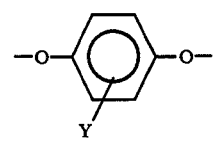

[d]

where X and Y are each independently a hydrogen atom, Cl, Br or an alkyl group having 1 to 4 carbon atoms, the repeating units a, b, c and d being in mole ratios such that (a+b)/(c+d) is approximately 1, a/b is in the range from 98/2 to 50/50 and c/d is in the range from 70/30 to 10/90.

5 Claims, 4 Drawing Sheets

LIQUID CRYSTALLINE POLYESTERS

BACKGROUND OF THE INVENTION

The present invention relates to a liquid crystalline polyester, particularly a liquid crystalline polyester which permits its orientation in the state of liquid crystal to be immobilized easily as glass phase and which is suitable for application to optical elements.

Recently, as to liquid crystalline polymers, researches and developments have been made actively in the field of high-performance materials utilizing high heat resistance and moldability and also in the field of functional materials utilizing phase immobilization and changes in the liquid crystal structure caused by heat or by an external field such as an electric field. In the high-performance material field, liquid crystalline polymers have already been commercialized. On the other hand, in the functional material field, researches have been made actively for attaining the application of such polymers to optical recording, non-linear optical materials, alignment film for liquid crystal, optical fiber and optical element for a liquid crystal display, but commercialization has not been made yet. In the case of using a liquid crystalline polymer as a functional material, a phase structure thereof obtained in the state of liquid crystal is immobilized for use in most cases.

It is a great attractive point of the liquid crystalline polymer that such immobilization can be made. But for making the immobilization possible and for the immobilized liquid crystal structure to be stable at a working temperature, it is absolutely necessary that the liquid crystalline polymer used should have a glass phase at a temperature lower than the liquid crystal transition point thereof. If there is used a polymer having a crystal phase at a temperature lower than the liquid crystal transition point thereof, it will be impossible to effect immobilization, or a liquid crystal structure thereof once immobilized will be relaxed with the lapse of time. Liquid crystalline polymers can be broadly classified into main chain type liquid crystalline polymers and side chain type liquid crystalline polymers. From the industrial standpoint, main chain type liquid crystalline polymers are preferred because they are less expensive and easier to manufacture. Particularly, liquid crystalline polyesters are preferred.

However, many polyesters are generally high in crystallinity and difficult to be immobilized, so their application to functional materials has not so progressed yet.

It is the object of the present invention to provide a novel liquid crystalline polyester which has a glass phase at a temperature lower than the liquid crystal transition point thereof and which permits an oriented structure thereof in the state of liquid crystal to be immobilized easily and is therefore suitable for application to various functional materials.

SUMMARY OF THE INVENTION

The present invention resides in a liquid crystalline polyester consisting essentially of repeating units a, b, c and d represented by the following general formulae:

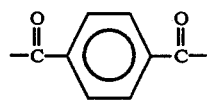  [a]

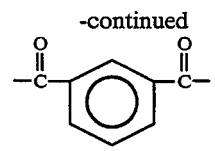  [b]

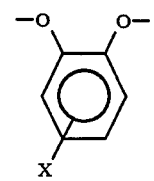  [c]

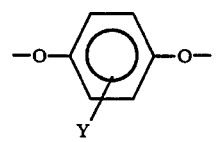  [d]

where X and Y are each independently a hydrogen atom, Cl, Br or an alkyl group having 1 to 6 carbon atoms, and as to composition ratios (mole ratios) of the repeating units a, b, c and d, $(a+b)/(c+d)$ is approximately 1, $a/b$ is in the range from 98/2 to 50/50, and $c/d$ is in the range from 70/30 to 10/90.

The polymer of the present invention comprises terephthalic acid units (a), isophthalic acid units (b), catechol units (c) and hydroquinone units (d), which are represented by the above general formulae. Although many liquid crystalline polyesters having aromatic structures are known, a polymer containing both isophthalic acid units and catechol units is not known at all. Generally, a rigid molecule high in linearity is preferred for developing a good liquid crystallinity, but isophthalic acid units and catechol units act to disturb the linearity of the molecule, so the structure containing both such units is considered undesirable from the standpoint of liquid crystal molecule design. Although examples of introducing isophthalic acid units into the molecule for the purpose of adjusting such physical properties as solubility and melt viscosity are found here and there, an example of using both isophthalic acid units and catechol units has not been known.

For the purpose of preparing a polyester suitable as a functional material, the present inventors have positively introduced both isophthalic acid units and catechol units, although such is usually avoided. As a result, we found out that the polymer of the above formulae assumed glass phase at a temperature lower than the liquid crystal transition point (i.e., glass transition point Tg) thereof and that therefore its liquid crystal structure could be immobilized without impairing its liquid crystallinity. In this way we accomplished the present invention.

DETAILED DESCRIPTION OF THE INVENTION

The present invention will be described in detail hereinunder.

In the above formulae, the unit a is usually based on terephthalic acid or a functional derivative thereof such as dimethyl terephthalate, the unit b is usually based on isophthalic acid or a functional derivative thereof such as dimethyl isophthalate, and the unit c is usually based on catechol or a functional derivative thereof such as substituted catechol, catechol diacetate or substituted catechol diacetate. X is a hydrogen atom, Cl, Br or an alkyl group having 1 to 6, preferably 1 to 4, carbon atoms. As examples of such alkyl group there are mentioned methyl, ethyl, propyl, i-propyl, butyl and t-butyl, with methyl, ethyl and t-butyl being particularly preferred. The unit d is based on hydroquinone or a functional derivative thereof such as hydroquinone diacetate, substituted hydroquinone or substituted hydroquinone diacetate. Y is a hydrogen atom, Cl, Br or an alkyl group having 1 to 6, preferably 1 to 4, carbon atoms. Examples of such alkyl group are methyl, ethyl, propyl, i-propyl, butyl and t-butyl, with methyl, ethyl and t-butyl being particularly preferred. Of course, it is optional whether the constituent units are to be arranged in block or random form, with no special limitation being placed thereon.

As to composition ratios (mole ratios) of the repeating units a, b, c and d, (a+b)/(c+d) is approximately 1, usually in the range from 45/55 to 55/45, preferably 48/52 to 52/48, more preferably 50/50. The value of a/b is in the range from 98/2 to 50/50, preferably 90/10 to 55/45. In the case where a/b is larger than 98/2, that is, when the proportion of isophthalic acid units is too small, it is sometimes difficult to effect the vitrification which is intended, though depending on the amount of catechol units. If a/b is smaller than 50/50, that is, if the proportion of isophthalic acid units is too high, it will be difficult to form a liquid crystal phase. The value of c/d is in the range from 70/30 to 10/90, preferably 60/40 to 20/80. A larger c/d value than 70/30, that is, a too high proportion of catechol units, is not desirable because the formation of liquid crystal becomes difficult. A smaller c/d value than 10/90, that is, a too small amount of catechol units, is not desirable, either, because it is impossible to obtain the desired glass phase.

The molecular weight of the polymer is preferably in the range of 0.05 to 3.0, more preferably 0.07 to 2.0, in terms of $\eta$inh as determined at 30° C. in phenol/tetrachloroethane mixed solvent (60/40 weight ratio). If the value of $\eta$inh is smaller than 0.05, deterioration in strength may result, while a larger $\eta$inh value than 3.0 will result in that the melt viscosity becomes too high, which may lead to deterioration in the orientability of liquid crystal.

The Tg of the polymer is preferably higher than 30° C., more preferably higher than 50° C. Although the upper limit of Tg is not specially limited, it is usually below 300° C. or so. If Tg is lower than 30° C., even if orientation in the state of liquid crystal can be immobilized once, there will gradually occur relaxation of the orientation thereafter, causing disorder of the structure, thus sometimes resulting in the polymer being difficult to use stably as an industrial material.

How to prepare the polymer of the present invention is not specially limited. The polymer of the invention can be prepared by a polymerization method known in the field concerned, for example, a melt polymerization process or a solution polymerization process using an acid chloride of a corresponding dicarboxylic acid.

In the case where a melt polycondensation process is adopted, the polymer can be prepared, for example, by reacting terephthalic acid (component $a^1$) and isophthalic acid (component $b^1$), at a high temperature and a reduced pressure, with a catechol diacetate (component $c^1$) represented by the following general formula:

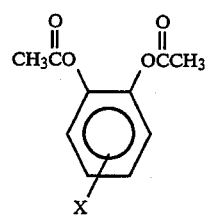

wherein X is as defined previously, and a hydroquinone diacetate (component $d^1$) represented by the following general formula:

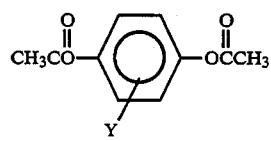

wherein Y is as defined previously.

As examples of the above catechol diacetate there are mentioned catechol diacetate, 4-methylcatechol diacetate, 4-ethylcatechol diacetate, 4-propylcatechol diacetate, 4-t-butylcatechol diacetate, 4-bromocatechol diacetate and 4-chlorocatechol diacetate. Examples of the above hydroquinone diacetate include hydroquinone diacetate, methylhydroquinone diacetate, ethylhydroquinone diacetate, t-butylhydroquinone diacetate, chlorohydroquinone diacetate and bromohydroquinone diacetate.

The molecular weight can be controlled easily by controlling the polymerization time or the feed composition. Polymerization conditions are not specially limited, but usually involve a temperature of 150° C. to 350° C., preferably 200° C. to 300° C., a reaction time of 30 minutes or longer, preferably 1 to 20 hours, and a pressure of preferably a reduced pressure. As to feed compositions (mole ratios) of the starting components $a^1$ to $d^1$, the value of $(a^1+b^1)/(c^1+d^1)$ is approximately 1, usually in the range from 40/60 to 60/40, preferably 45/55 to 55/45, more preferably 48/52 to 52/48, most preferably 50/50. The value of a/b is usually in the range from 98/2 to 50/50, preferably 90/10 to 55/45, and the value of $c^1/d^1$ is usually in the range from 70/30 to 10/90, preferably 60/40 to 20/80.

For accelerating the polymerization reaction there may be used a known metal salt such as, for example, sodium acetate or zinc acetate.

In the case of preparing the liquid crystalline polyester of the present invention according to the solution polymerization process, the desired polyester can be obtained easily by dissolving a terephthalic acid dihalide ($a^2$), isophthalic acid dichloride ($b^2$), a catechol ($c^2$) of the following general formula:

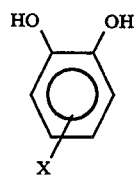

and a hydroquinone ($d^2$) of the following general formula:

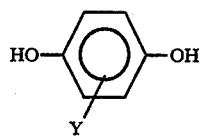

in a solvent, followed by heating in the presence of an acid acceptor.

As examples of the terephthalic acid dihalide there are mentioned terephthalic acid dichloride and terephthalic acid dibromide. Examples of the said catechol include catechol, 4-methylcatechol, 4-ethycatechol, 4-propylcatechol, 4-t-butylcatechol, 4-bromocatechol and 4-chlorocatechol. Examples of the above hydroquinone are hydroquinone, methylhydroquinone, ethylhydroquinone, t-butylhydroquinone, chlorohydroquinone and bromohydroquinone.

The solvent to be used is not specially limited, but as examples thereof there are mentioned halogen containing solvents such as o-dichlorobenzene, dichloroethane and tetrachloroethane, polar solvents such as DMSO, DMF and NMP, and ether type solvents such as THF and dioxane. The acid acceptor to be used is not specially limited, either. Examples are pyridine, triethylamine, tripropylamine, dimethylsulfoxide (DMSO), dimethylformamide (DMF), N-methylpyrrolidone (NMP) and tetrahydrofurane (THF).

Conditions for the solution polymerization are not specially limited, but usually involve a temperature of 50° C. to 200° C., preferably 60° C. to 150° C., and a reaction time of 1 to 10 hours, preferably 2 to 7 hours. As to feed compositions (mole ratios) of the starting components $a^2$ to $d^2$, the value of $(a^2+b^2)/(c^2+d^2)$ is approximately 1, usually in the range from 40/60 to 60/40, preferably 45/55 to 55/45, more preferably 48/52 to 52/48, most preferably 50/50. The value of $a^2/b^2$ is usually in the range from 98/2 to 50/50, preferably 90/10 to 55/45, and the value of $c^2/d^2$ is usually in the range from 70/30 to 10/90, preferably 60/40 to 20/80.

EXAMPLES

The following examples are given, but it is to be understood that the invention is not limited thereto. The following analyzing methods were used in those examples.

(1) Determination of Composition

Each polymer obtained was dissolved in deuterated chloroform or deuterated trifluoroacetic acid and the composition thereof was determined by using $^1$H-NMR of 400 MHz (JNM-GX400, a product of Japan Electron Optics Laboratory Co., Ltd.).

(2) Measurement of Inherent Viscosity

Determined at 30° C. in phenol/tetrachloroethane (60/40 weight ratio) mixed solvent, using a Ubbelohde's viscometer.

(3) Measurement of DSC

Determined using Du Pont 990 Thermal Analyzer.

(4) Observation using Optical Microscope

Observed using a polarizing microscope, BH2 (a product of Olympus Optical Co., Ltd.).

EXAMPLE 1

50 mmol of terephthalic acid dichloride, 15 mmol of isophthalic acid dichloride, 40 mmol of hydroquinone and 27 mmol of catechol were dissolved in 300 ml of o-dichlorobenzene, then 30 ml of pyridine was added as an acid acceptor, followed by heating with stirring in a current of nitrogen gas at 70° C. for 3 hours to afford a polymer. The reaction solution was poured into a large amount of methanol and the precipitated polymer was recovered. The composition and ηinh of the polymer are as shown in Table 1. According to DSC measurement and polarizing microscope observation, the polymer had a Tg of 101° C., having glass phase, and exhibited a nematic liquid crystal phase at higher temperatures. A small amount of the polymer was placed onto a slide glass, then a cover glass was put thereon, followed by heating on a hot plate at 180° C. for 10 minutes. Thereafter, the polymer sample was brought down from the hot plate and cooled. The sample was transparent. As a result of polarizing microscope observation, it turned out that the nematic liquid crystal phase was immobilized.

EXAMPLE 2

100 mmol of terephthalic acid, 18 mmol of isophthalic acid, 60 mmol of methylhydroquinone diacetate and 60 mmol of catechol diacetate were heated with stirring in a current of nitrogen gas at 280° C. for 6 hours to prepare a polymer. The polymer was then dissolved in tetrachloroethane and the resulting solution was poured into a large amount of methanol to purity the polymer. The composition and ηinh of the polymer thus obtained are as shown in Table 1. According to DSC measurement and polarizing microscope observation, the polymer had a Tg of 99° C., having glass phase, and exhibited a nematic liquid crystal phase at higher temperatures. A small amount of the polymer was placed on a slide glass, then a cover glass was put thereon, followed by heating on a hot plate at 180° C. for 10 minutes. Thereafter, the polymer sample was brought down from the hot plate and cooled. As a result of polarizing microscope observation, it turned out that the nematic liquid crystal phase was immobilized.

EXAMPLES 3-6

Polymers were prepared as Examples 4 and 5 in accordance with the procedure of Example 1, while polymers were prepared as Examples 3 and 6 in accordance with the procedure of Example 2. Properties of these polymers are as shown in Table 1. When these polymers were cooled from the state of liquid crystal to a temperature below the respective Tg levels in the same manner as in Examples 1 and 2, their nematic orientations in the state of liquid crystal were immobilized, affording highly transparent films.

COMPARATIVE EXAMPLE 1

100 mmol of terephthalic acid, 70 mmol of isophthalic acid, 165 mmol of hydroquinone diacetate and 7 mmol of catechol diacetate were heated with stirrig in a current of nitrogen gas at 280° C. for 8 hours to prepare a polymer. The polymer was then dissolved in tetrachloroethane and the resulting solution was poured into a large amount of methanol to purify the polymer. The composition and ηinh of the polymer thus obtained are as shown in Table 1. The polymer exhibited a nematic liquid crystal phase, but in DSC measurement, it exhibited a clear crystallization peak and did not exhibit Tg. Although immobilization of the liquid crystal structure was tried in the same way as in Example 1, it was impossible because of the polymer having the crystal phase, and the film obtained after cooling was a whitely turbid crystal polymer film.

COMPARATIVE EXAMPLE 2

50 mmol of terephthalic acid, 120 mmol of isophthalic acid, 110 mmol of hydroquinone diacetate and 60 mmol of catechol diacetate were heated with stirring in a current of nitrogen gas at 280° C. for 7 hours to prepare a polymer. The polymer was then dissolved in tetrachloroethane and the resulting solution was poured into a large amount of methanol to purify the polymer. The composition and ηinh of the polymer thus obtained are as shown in Table 1. As a result of DSC measurement and polarizing microscope observation, the polymer was found to have a Tg of 130° C., have no liquid crystal phase and exhibit a glass phase at temperatures below Tg and an isotropic phase at temperatures higher than Tg.

FIG. 2 shows a DSC thermogram of the polyester prepared in Example 2 according to the present invention;

FIG. 3 shows a DSC thermogram of the polyester prepared in Example 3 according to the present invention;

FIG. 4 shows a DSC thermogram of the polyester prepared in Example 4 according to the present invention;

FIG. 5 shows $^1$H-NMR spectrum of the polyester prepared in Example 2 according to the present invention; and FIG. 6 shows $^1$H-NMR spectrum of the polyester prepared in Example 6 according to the present invention.

What is claimed is:

1. A liquid crystalline polyester consisting essentially of repeating units a, b, c and d represented by the following general formulae:

[a]

TABLE 1

| | Polymers obtained in Examples and Comparative Examples | | | | | | | |
|---|---|---|---|---|---|---|---|---|
| Example No. and Comparative Example No. | Structure (formula) | | | | Composition (mole ratio) a:b:c:d | ηinh (dl/g) | Tg (°C.) | Liquid Crystal Phase | Immobilization |
| | unit a | unit b | unit c | unit d | | | | | |
| Example | | | | | | | | | |
| 1 | TPA | IPA | CT | HQ | 40:11:21:28 | 0.25 | 104 | Nm | o |
| 2 | TPA | IPA | CT | MHQ | 42:8:26:24 | 0.21 | 99 | Nm | o |
| 3 | TPA | IPA | MCT | MHQ | 31:19:12:38 | 0.31 | 110 | Nm | o |
| 4 | TPA | IPA | MCT | ClHQ | 27:24:7:42 | 0.15 | 94 | Nm | o |
| 5 | TPA | IPA | BrCT | HQ | 30:20:8:42 | 0.89 | 131 | Nm | o |
| 6 | TPA | IPA | CT | t-BuHQ | 41:9:25:25 | 0.65 | 122 | Nm | o |
| Comparative Example | | | | | | | | | |
| 1 | TPA | IPA | CT | HQ | 31:19:2:48 | 0.35 | none | Nm | X |
| 2 | TPA | IPA | CT | HQ | 14:36:15:35 | 0.28 | 103 | non | — |

(note)
NM: nematic liquid crystal phase,
IPA: isophthalic acid unit,
MCT: 4-methylcatechol unit,
HQ: hydroquinone unit,
ClHQ: chlorohydroquinone unit,
TPA: terephthalic acid unit,
CT: catechol unit,
BrCT: 4-bromocatechol unit,
MHQ: methylhydroquinone unit,
t-BuHQ: tert-butylhydroquinone unit Since the liquid crystalline polyester of the present invention has a glass phase at a temperature lower than the liquid crystal transition point thereof, its oriented structure in the state of liquid crystal can be immobilized by cooling the polymer from the temperature at which it assumes the state of liquid crystal down to a temperature lower than its liquid crystal transition point (glass transition point). The material thus obtained which is transparent and which holds the oriented structure in liquid crystal is applicable suitable to various functional materials, especially optical elements, and thus its industrial value is extremely high.

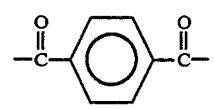

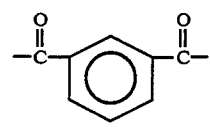

[b]

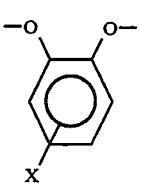

[c]

[d] 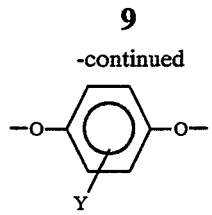

Figure 1:
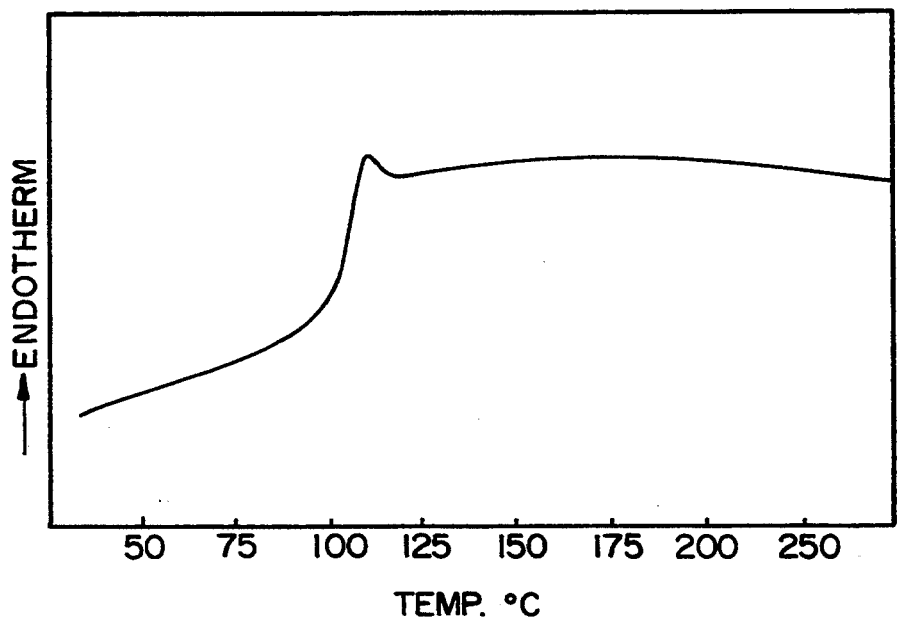
FIG. 1 shows a DSC thermogram of the polyester prepared in Example 1 according to the present invention, in which endotherm and temperature are plotted along the axis of ordinate and the axis of abscissa, respectively, (as is also the case with FIGS. 2 to 4)
Figure 2:
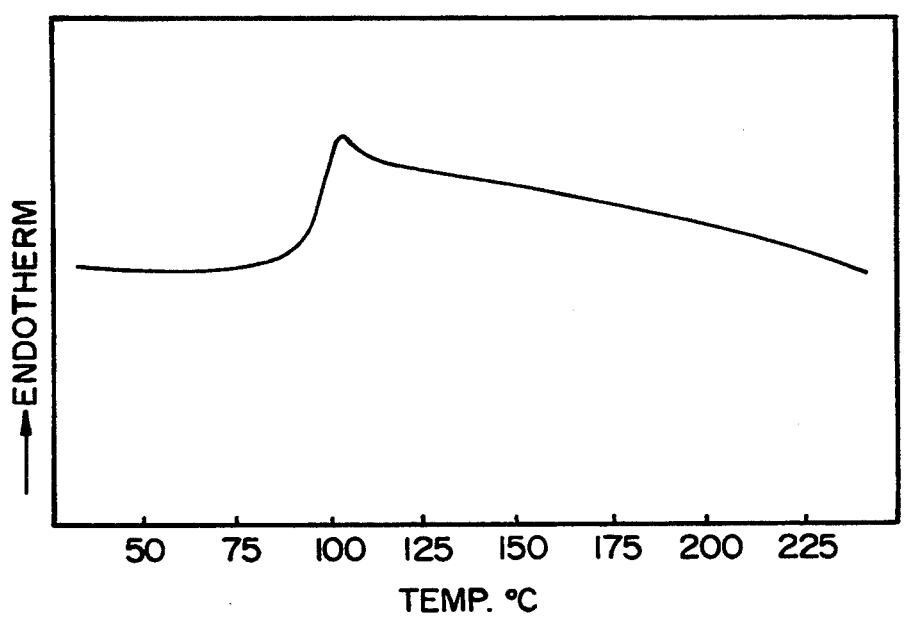
Figure 3:
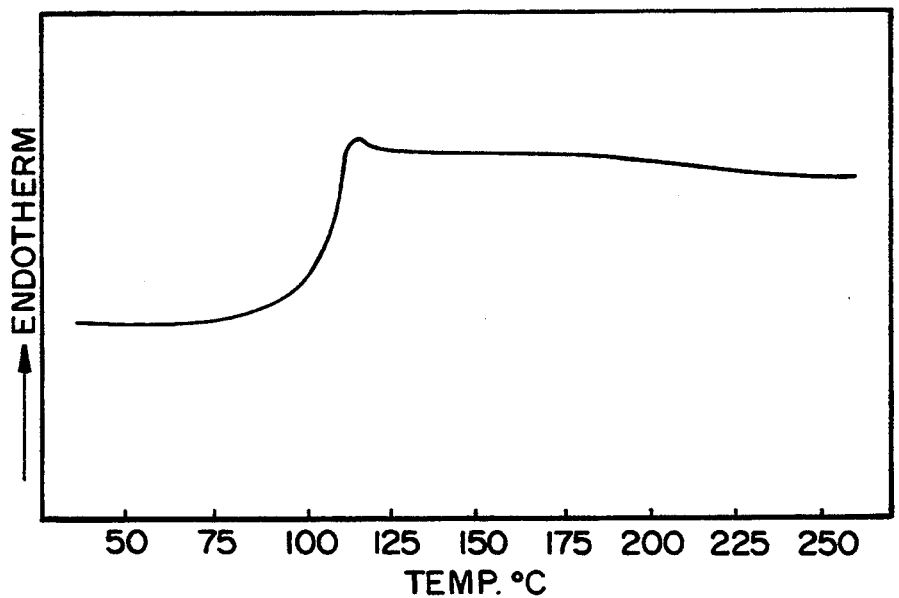
Figure 4:
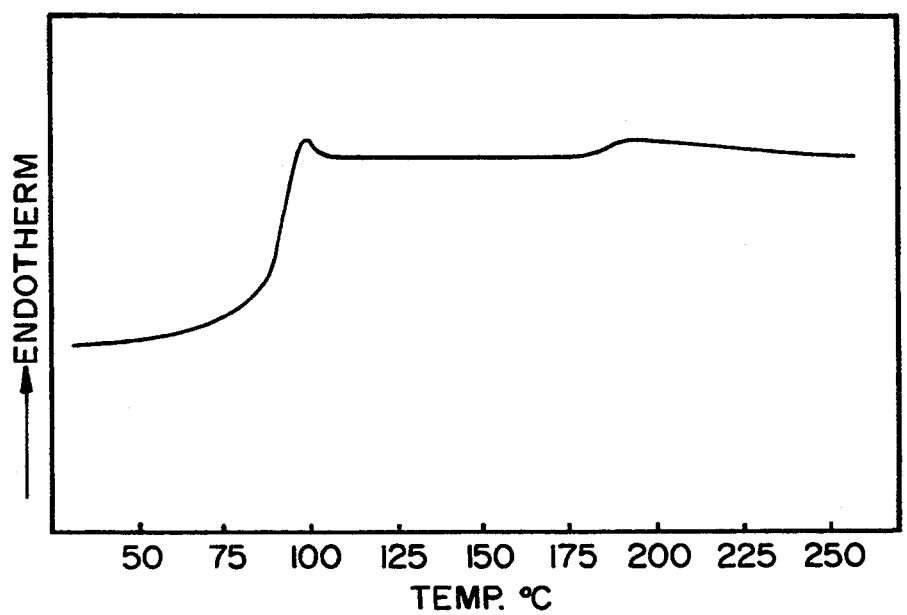
Figure 5:
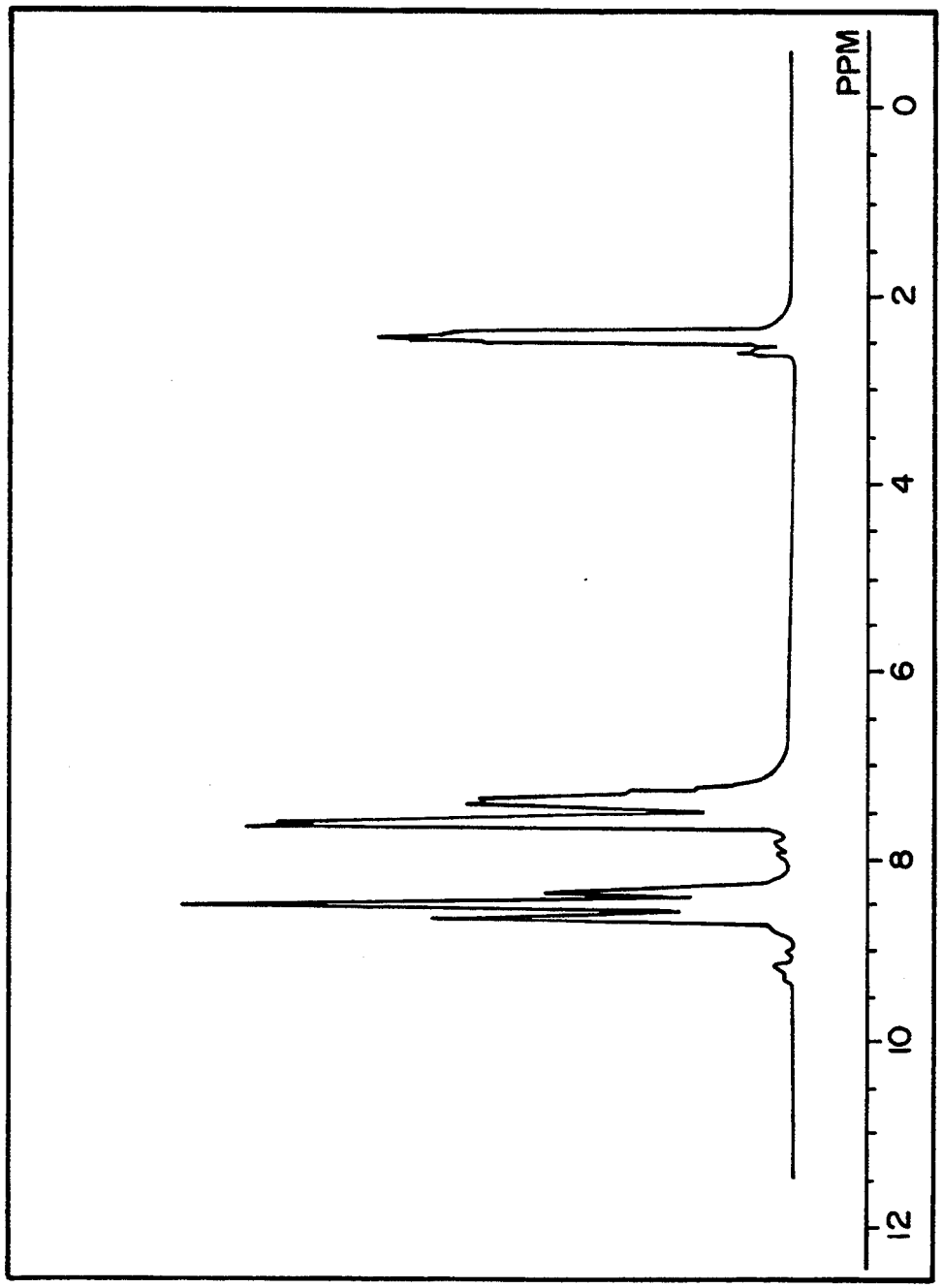
Figure 6:
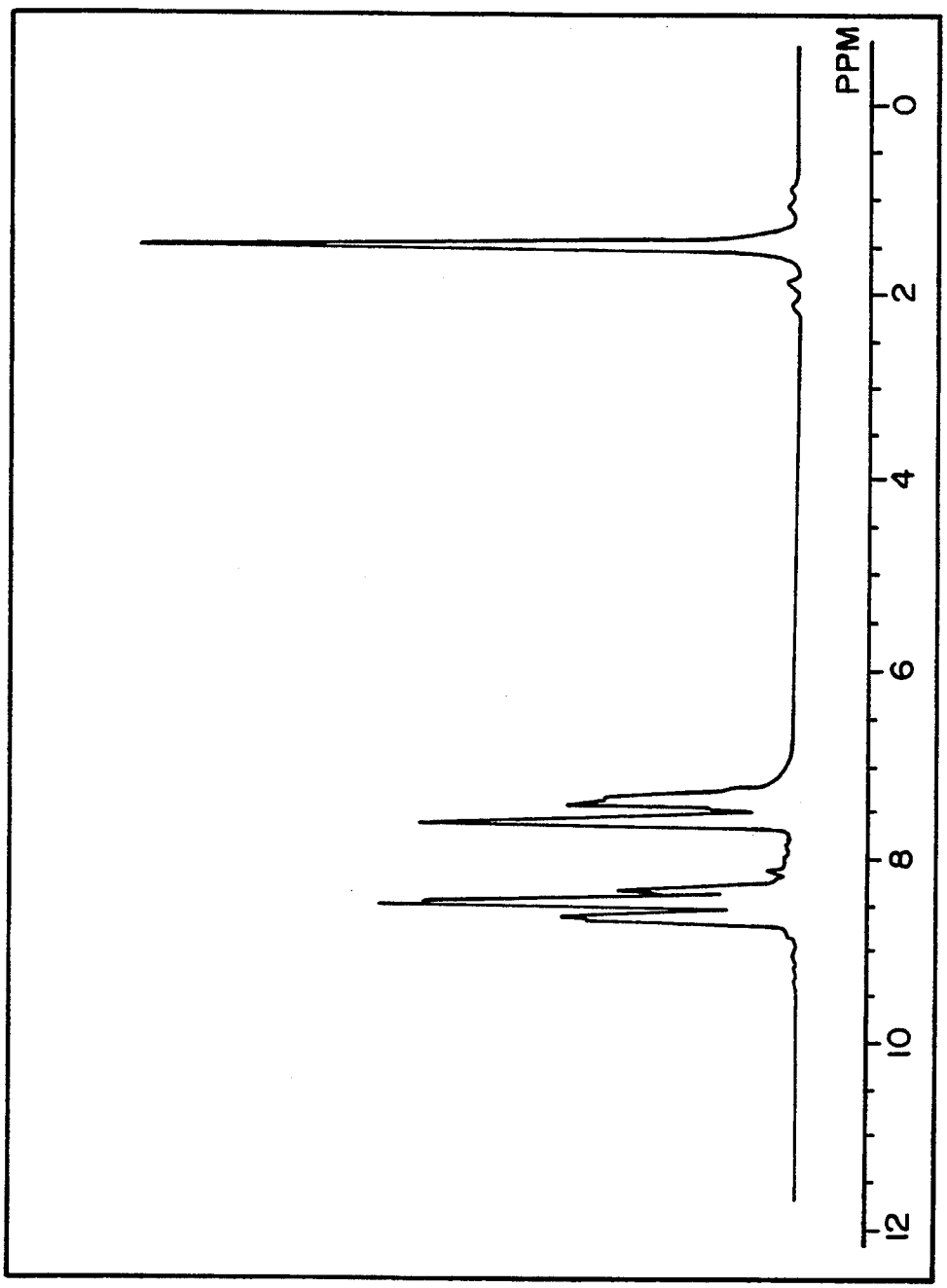

where X and Y are each independently a hydrogen atom, Cl, Br or an alkyl group having 1 to 4 carbon atoms, said repeating units a, b, c and d being in mole ratios wherein (a+b)/(c+d) is approximately 1, a/b is in the range from 98/2 to 50/50 and c/d is in the range of from 70/30 to 10/90.

2. A liquid crystalline polyester as set forth in claim 1, where the repeating units a, b, c and d are in mole ratios wherein (a+b)/(c+d) is in the range of from 45/55 to 55/45, a/b, is in the range of from 90/10 to 55/45 and c/d is in the range of from 60/40 to 20/80.

3. A liquid crystalline polyester as set forth in claim 1, having an inherent viscosity, $\eta$inh, of 0.05 to 3.0 as determined in phenol/tetrachloroethane mixed solvent (60/40 weight ratio) at 30° C.

4. A liquid crystalline polyester as set forth in claim 1, having a glass transition temperature (Tg) higher than 30° C.

5. A liquid crystalline polyester as set forth in claim 1, wherein X and Y are each independently a hydrogen atom, Cl, Br, methyl, ethyl or t-butyl.

* * * * *